US012795047B2

(12) United States Patent

Shao et al.

(10) Patent No.: US 12,795,047 B2
(45) Date of Patent: Nov. 10, 2026

(54) IDENTIFYING A VIDEO FRAME FOR AN IMAGE IN A VIDEO CONFERENCE

(71) Applicant: Zoom Communications, Inc., San Jose, CA (US)

(72) Inventors: Xiaoliang Shao, SuZhou (CN); Yangqing Zhang, SuZhou (CN)

(73) Assignee: Zoom Communications, Inc., San Jose, CA (US)

( * ) Notice: Subject to any disclaimer, the term of this patent is extended or adjusted under 35 U.S.C. 154(b) by 73 days.

(21) Appl. No.: 18/488,577

(22) Filed: Oct. 17, 2023

(65) Prior Publication Data

US 2025/0126225 A1 Apr. 17, 2025

(51) Int. Cl.
*H04N 7/15* (2006.01)
*G06V 10/44* (2022.01)

(52) U.S. Cl.
CPC ............. *H04N 7/155* (2013.01); *G06V 10/44* (2022.01)

(58) Field of Classification Search
None
See application file for complete search history.

(56) References Cited

U.S. PATENT DOCUMENTS 9,582,406 B1 2/2017 Teplitsky et al.
10,304,458 B1 5/2019 Woo
10,593,175 B1 * 3/2020 Jennings .......... G08B 13/19669
2008/0292299 A1 * 11/2008 Kretz ................... H04N 23/611 348/E5.042
2012/0011454 A1 1/2012 Droz et al.
2013/0142452 A1 6/2013 Shionozaki et al.
2013/0342629 A1 * 12/2013 North ............... H04N 21/44008 348/E7.078
2016/0234551 A1 8/2016 Allegretti et al.
2018/0330501 A1 11/2018 Muraoka et al.
2020/0401812 A1 12/2020 Cheng et al.
2021/0037271 A1 2/2021 Bikumala
2021/0295096 A1 * 9/2021 Vu ....................... G06V 10/774
2021/0382672 A1 * 12/2021 Back ........................ H04R 5/02
(Continued)

FOREIGN PATENT DOCUMENTS

CN 106372627 A 2/2017
CN 107635110 A 1/2018
WO 2016164720 A1 10/2016

OTHER PUBLICATIONS

10scopes.com, Screenshot in Microsoft Teams Meeting [Take Quick Snapshots], https://10scopes.com/screenshot-in-microsoft-teams-meeting/, Farhan Max, retrieved from internet Aug. 18, 2023, 13 pages.
(Continued)

*Primary Examiner* — Duc Nguyen
*Assistant Examiner* — Assad Mohammed
(74) *Attorney, Agent, or Firm* — Young Basile Hanlon & MacFarlane, P.C.

(57) ABSTRACT

A client device downloads pre-trained model configuration data for identifying video frames having a specified feature. The client device identifies, using an image selection engine configured according to the pre-trained model configuration data, a video frame having the specified feature during an online video conference to which the client device is connected. The client device transmits, to a server, an identifier of the video frame for storage in connection with a recording of the online video conference.

21 Claims, 11 Drawing Sheets

(56) References Cited

U.S. PATENT DOCUMENTS

| | | | | |
|---|---|---|---|---|
| 2022/0114142 | A1* | 4/2022 | Madisetti | G06F 16/48 |
| 2022/0370733 | A1* | 11/2022 | Mireles | H04N 7/147 |
| 2023/0154166 | A1* | 5/2023 | Pauli | G06V 10/7747<br>340/568.1 |
| 2023/0206607 | A1* | 6/2023 | Dopp | G06V 10/761<br>345/426 |
| 2023/0237843 | A1 | 7/2023 | Namose et al. | |
| 2023/0397868 | A1* | 12/2023 | Yamazaki | A61B 5/165 |
| 2025/0055957 | A1* | 2/2025 | Ramamoorthy | G10L 15/08 |
| 2025/0077765 | A1* | 3/2025 | Xu | G06F 40/56 |

OTHER PUBLICATIONS

Fortune, Gen Zers are using apps like Remini and Canva to turn selfies into A.I.-generated professional headshots while saving big money, https://fortune.com/2023/07/19/tiktok-genz-millennials-generative-ai-headshots-remini-canva/, Paige Hagy, Jul. 19, 2023, 6 pages.

Beebom, 12 Best AI Headshot Generators You Should Try in 2023, https://beebom.com/best-ai-headshot-generators/, Upanishad Sharma, Sep. 20, 2023, 16 pages.

International Search Report and Written Opinion mailed on Jan. 17, 2025 in corresponding PCT Application No. PCT/US2024/050473.

* cited by examiner

IDENTIFYING A VIDEO FRAME FOR AN IMAGE IN A VIDEO CONFERENCE

FIELD

This disclosure generally relates to identifying a video frame in a video conference, and, more specifically, to identifying a video frame for an image having a specified feature.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
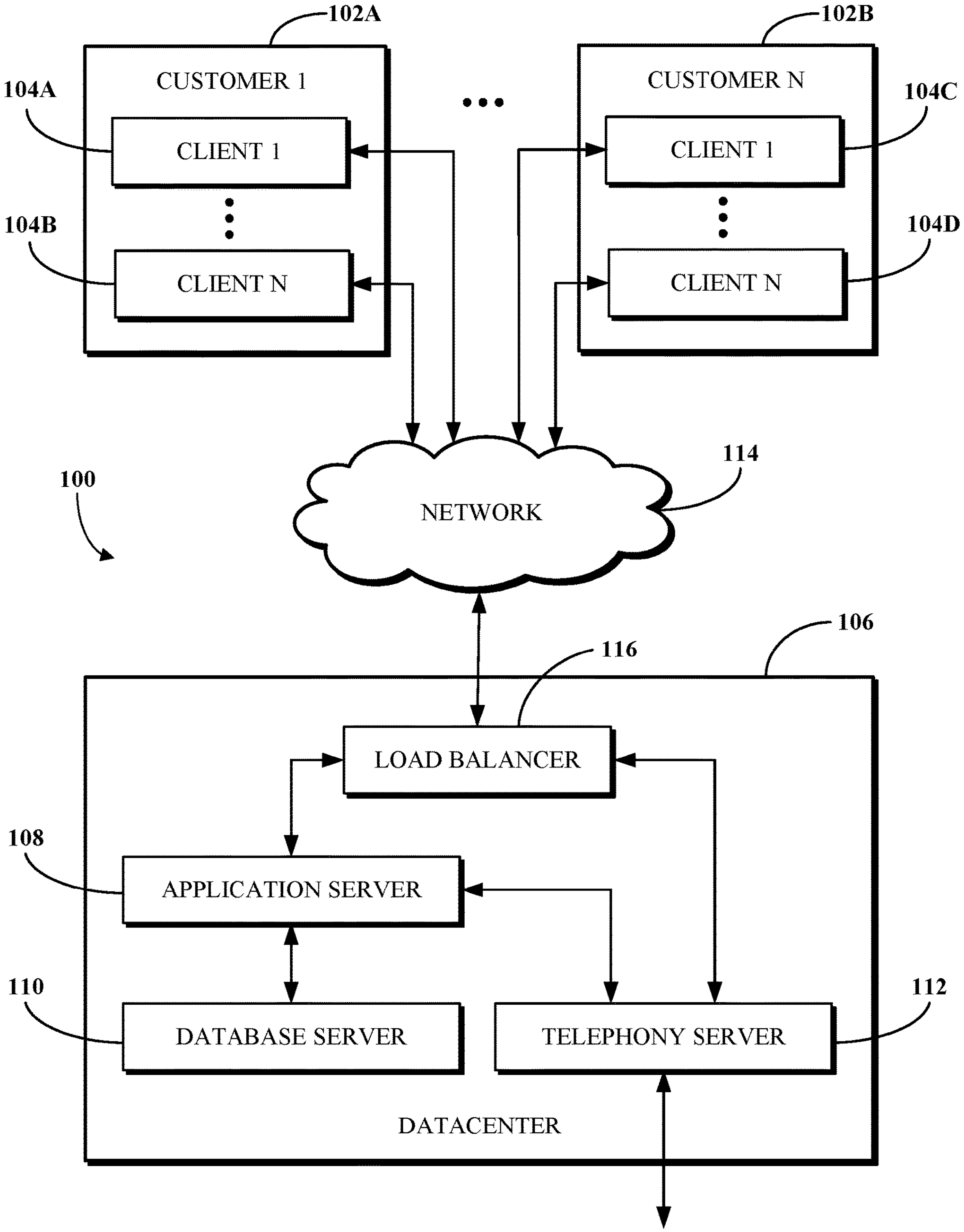
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

People value high quality images of themselves and use such images in many ways, for example, for webpages advertising the services of their business (e.g., a law firm website might include professional photographs of the attorneys), for online dating purposes, or for placing in family photo albums. An image may be considered high quality based, for example, on the manner in which the subject of the image is depicted (e.g., whether the subject's whole face is shown and centered) and the depiction of the subject being clear and in focus (e.g., not blurry or affected by blocking or like artefacts). It can be challenging to take a high quality image of a person that meets certain criteria (e.g., natural-looking, professional, handsome, or good for online dating). For example, to capture professional photographs, a person might have to take time to visit a professional photographer and pose in unnatural ways. This is expensive and time consuming, and might result in imagery that is obviously posed. Techniques for generating (e.g., producing including capturing) natural-looking images that are less time consuming may be desirable.

In many cases, people who need such images may be software users who engage in video conferences with their cameras turned on. During the video conference, there might be moments when such a user naturally poses in ways that meet certain criteria, such as those mentioned above. It would thus be desirable to automatically generate images meeting certain criteria from video conference data.

Implementations of this disclosure accordingly address problems such as those described above by automatically generate images of users of video conferencing services that have a specified feature (e.g., where the specified feature may encompass a single feature or a combination of multiple features). Prior to or during a video conference, a client device receives a specified feature of an image to be generated during the video conference. The specified feature may be selected by a user of the client device or by an information technology administrator associated with the client device and may include a single feature or multiple features. For example, the information technology administrator might provide the specified feature indicating professional imagery of the user for use in the business' marketing materials. The user might provide the specified feature indicating themselves having a cheerful disposition for placing the generated imagery in a family photo album. The client device downloads pre-trained model data (e.g., artificial intelligence (AI) model data trained by deep learning technology such as Core machine learning (ML), TensorFlow, PyTorch, or open neural network exchange (ONNX)) for use by an image selection engine in identifying video frames having the specified feature. The client device connects to a video conference with the video camera of the client device being turned on. During the video conference, the image selection engine identifies at least one timestamp (e.g., in the format HH:MM:SS, where HH represents the hour, MM represents the minute, and SS represents the second, for example, 00:26:31 the time may be measured based on a current time of day or based on an amount of time elapsed since a time point, for example, the start time of the video conference) corresponding to at least one video frame that has the specified feature. The client device transmits, to a server coupled with a data repository for storing a recording of the video conference, the at least one timestamp.

At a time when demand for the server is low (e.g., during night or weekend hours), the server accesses video frames that were generated proximate (in time) to the at least one timestamp (e.g., within two seconds of the at least one timestamp). The server uses artificial intelligence techniques to select at least one frame from those video frames that has a high (e.g., exceeding a threshold) likelihood of meeting the specified feature. At least one image based on the at least one frame is stored in a data repository (which may be the same as or different from the data repository storing the recording of the video conference). The at least one image may be downloaded from the data repository by the user or by another entity (e.g., the information technology administrator) who requested the at least one image.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for generating an image from a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
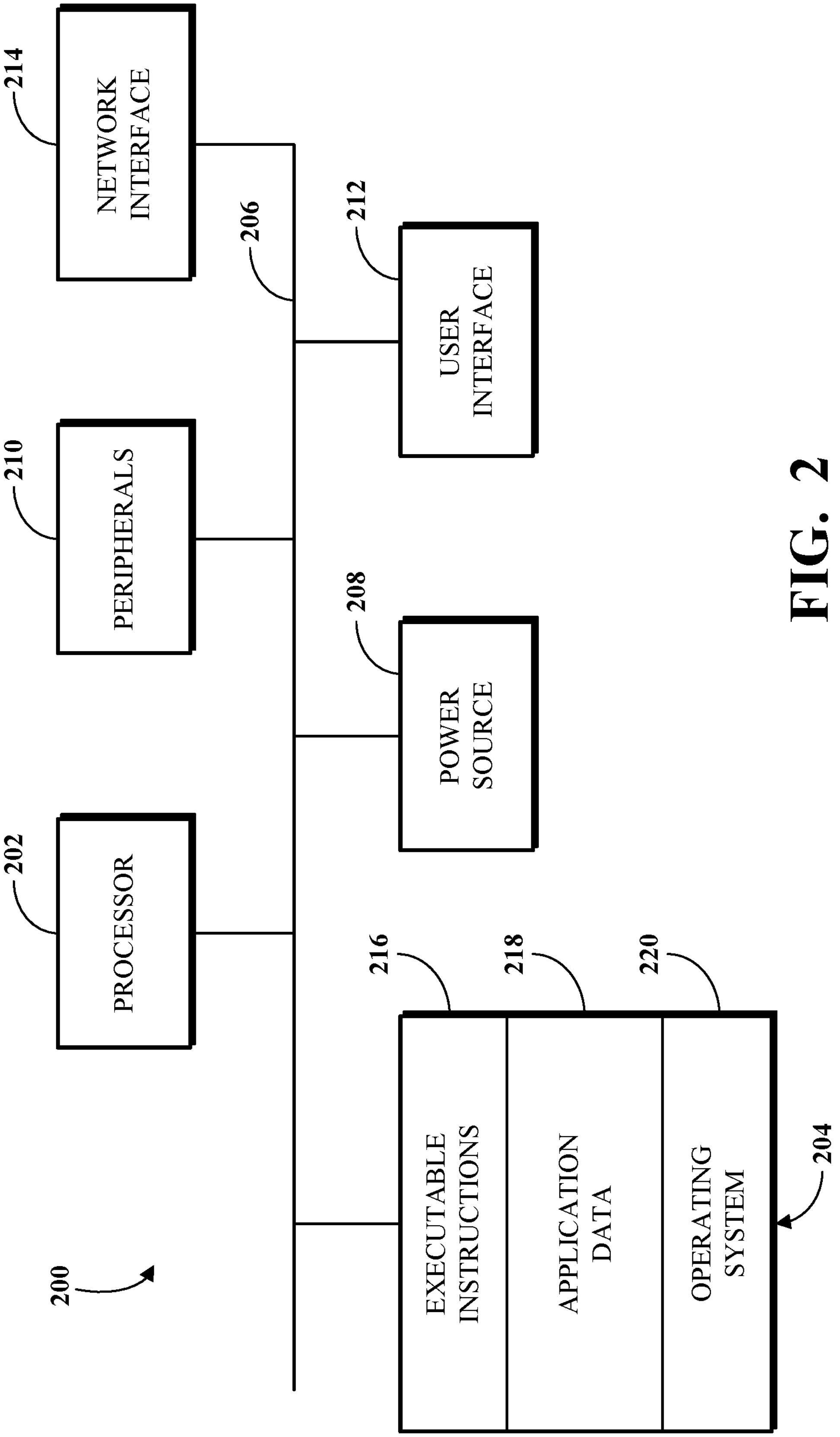
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi®, Bluetooth®, or ZigBee®), infrared, visible light, general packet radio service (GPRS), global system for mobile communications (GSM), code-division multiple access (CDMA), Z-Wave, another protocol, or a combination thereof.

Figure 3:
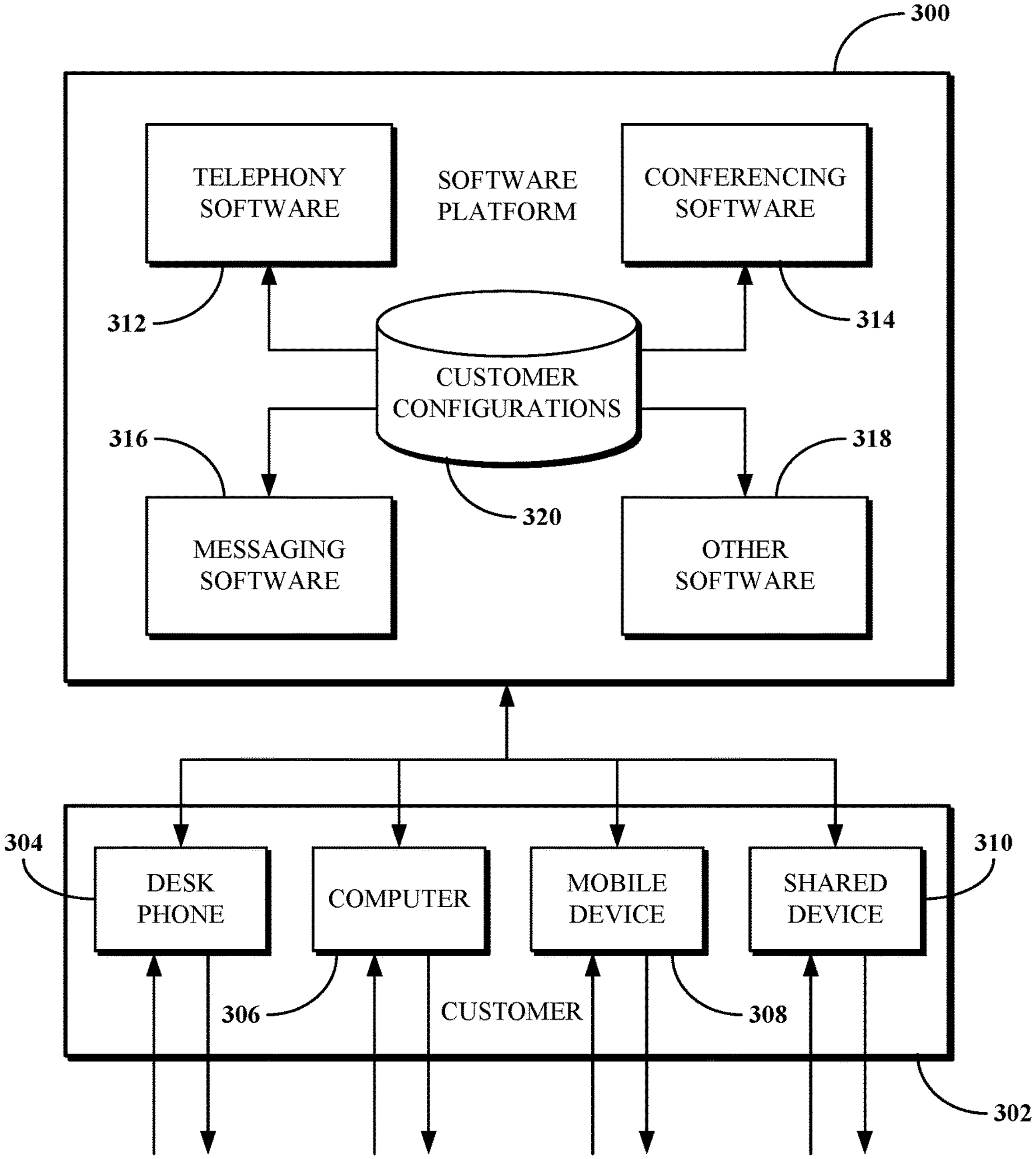
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients and other telephony-enabled devices, which may be other ones of the clients, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for generating an image from a video conference. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients.

Figure 4:
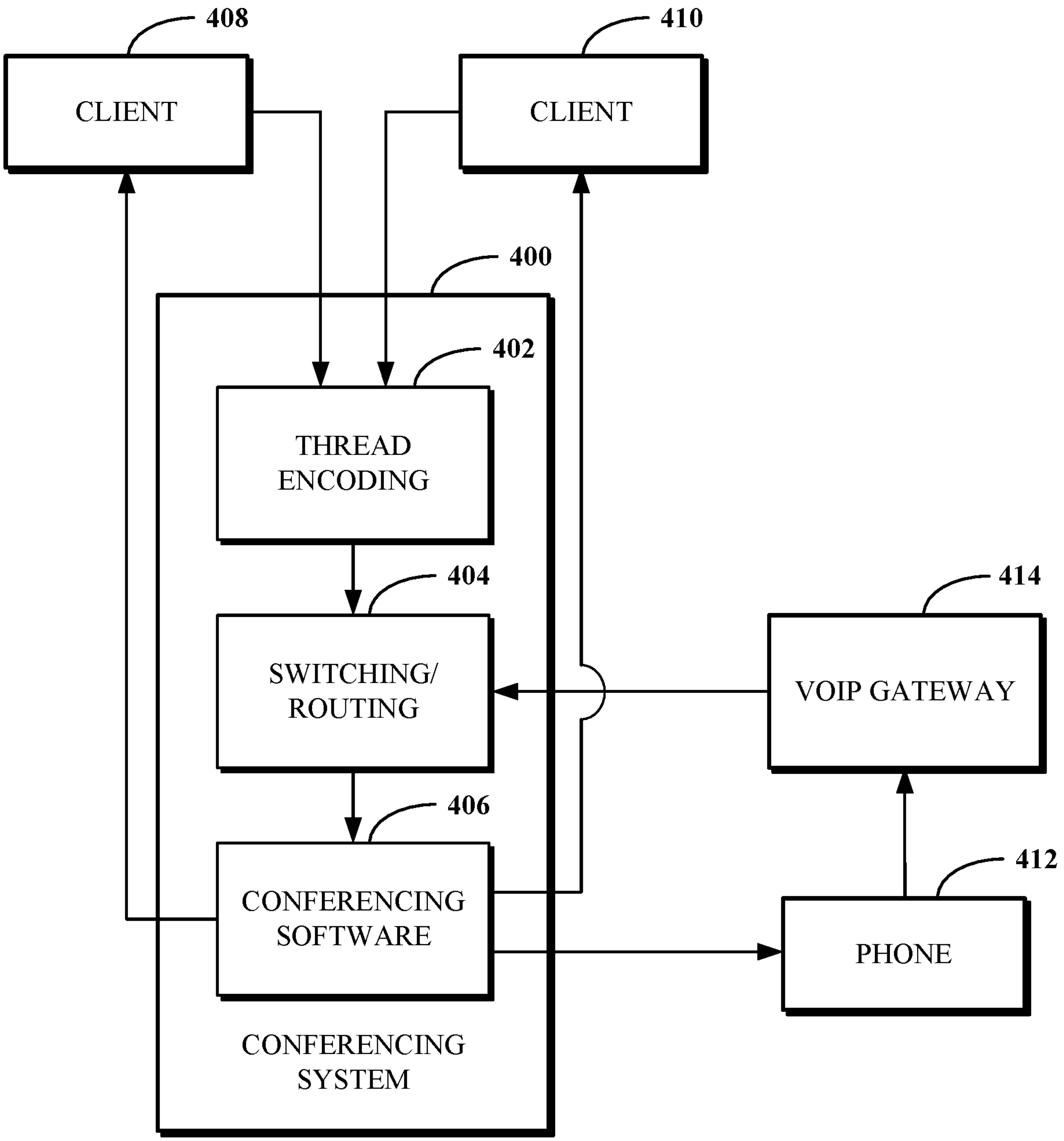
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients, including the desk phone 304, the computer 306, the mobile device 308, and the shared device 310, shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
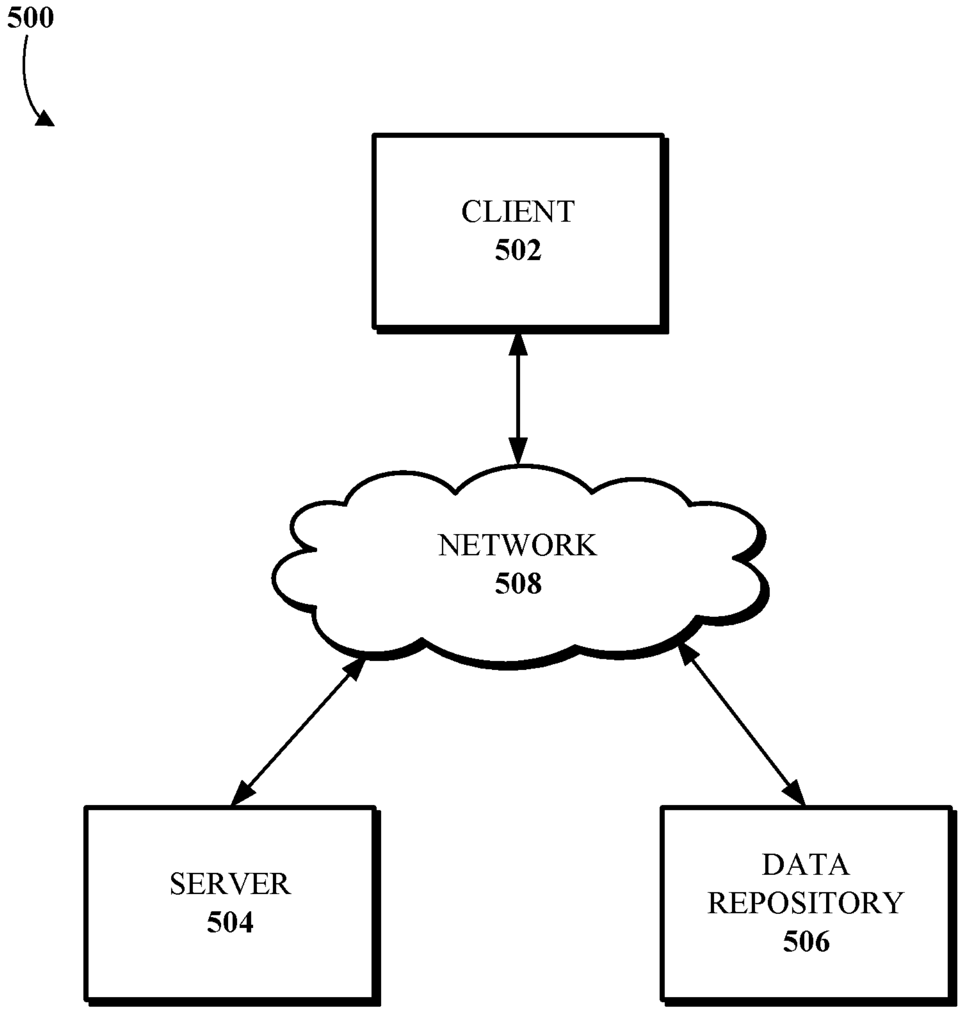
FIG. 5 is a block diagram of an example of a video conferencing system for identifying a frame for a photograph in a video conference.

FIG. 5 is a block diagram of an example of a video conferencing system 500 for identifying a frame for a photograph in a video conference. As shown, the video conferencing system 500 includes a client 502, a server 504, and a data repository 506 connected with one another via a network 508. The network 508 may include at least one of the internet, an intranet, a local area network, a wide area network, a wired network, a wireless network, a cellular network, or a Wi-Fi® network.

The client 502 is a computing device connected to a video conference via the server 504. The client 502 may be one of multiple clients connected to the video conference. The client may correspond to one of the clients 408 or 410. An example of the client 502 is described in more detail in conjunction with FIG. 6. The server 504 may be a server of the concerning system 400, and may include at least one of the thread encoding tool 402, the switching/routing tool 404, or the conferencing software 406. An example of the server 504 is described in more detail in conjunction with FIG. 7. The data repository 506 stores at least one of audio data, video data, or imagery from video conferences (e.g., including the video conference to which the client 502 is connected). The data repository 506 may be a database (e.g., a database of the datacenter 106 managed by the database server 110) or another type of data store.

In some implementations, the client 502 and the server 504 are used to generate an image of the user of the client 502 during the video conference, with the image having a feature specified by the user (or another person, such as an information technology administrator of the user). The client 502 downloads pre-trained model configuration data for identifying video frames having a specified feature. The specified feature may be, for example, at least one of the user smiling, the user being cheerful, the user looking professional, or the user looking attractive to potential mates in an online dating context. The configuration data may include a configuration file (or a configuration data structure different from a file) for an image selection engine (e.g., which implements artificial intelligence or machine learning technology) at the client, for example, the configuration data may specify weights to be applied to outputs of neurons in an artificial neural network. The client 502 identifies, using the image selection engine configured according to the pre-trained model configuration data, a video frame having the specified feature during the video conference to which the client 502 is connected. The client 502 transmits, to the server 504, an identifier (e.g., a timestamp, a frame identification number, or another identifier) of the video frame for storage in connection with a recording of the video conference.

In some implementations, the server 504 receives the identifier of the video frame. After a recording of the video conference (or at least a portion of the video conference) is stored in the data repository 506, the server 504 obtains a time-contiguous set of video frames based on the identifier of the video frame (e.g., video frames starting m seconds before and ending n seconds after the video frame associated with the identifier, where m and n are positive numbers). The server 504 computes, for each frame in at least a subset of the time-contiguous set of video frames, a score corresponding to a likelihood of having the specified feature. The score may be computed using statistical, artificial intelligence, or machine learning techniques. The server 504 determines, based on the computed scores, a frame having a highest likelihood of having the specified feature. The server 504 generates an image based on the determined frame using video frame to image conversion techniques. The generated image may be stored in the data repository 506 for downloading by the user of the client 502 or by another user interested in obtaining the image (e.g., the information technology administrator). In some example, multiple identifiers of video frames are identified by the client 502 and transmitted to the server 504. The server 504 identifies multiple first pass candidate frames and then selects a second pass frame based on the multiple first pass candidate frames. For example, the second pass frame may correspond to the first pass candidate frame having the highest likelihood of having the specified feature. The second pass frame corresponds to the image that is stored in the data repository 506.

As described above, the same data repository 506 stores the recording of the conference and the generated image. However, it should be noted that different data repositories may be used to store the recording of the conference and the generated image. In some cases, multiple different data repositories may be used to store the recording of the conference and/or the image, to provide redundancy. As used herein, the term data repository may encompass one or more data repositories.

Some aspects of the disclosed technology relate to obtaining and storing imagery of users. It should be noted that imagery of users is obtained and stored only after obtaining the affirmative consent of the user whose imagery is obtained and stored. For example, when the client 502 connects to the video conference, a message may appear on the screen specifying whether the video conference is being recorded, whether imagery will be obtained from the video conference, and identities of user accounts or machines requesting the imagery. The user may deny consent to the user accounts or the machines requesting the imagery. Alternatively, the user may turn off their video camera and may participate in the video conference without sharing camera-generated imagery from the client 502. If the video camera is turned off, the client 502 may still share audio data and/or screensharing data, and the client 502 may still access audio data, screensharing data, and or camera-generated data from other clients connected to the video conference. After the imagery of the user is stored in the data repository 506, the user may request the removal of the imagery from the data repository 506 at any time. In some cases, images in the data repository 506 may be deleted a threshold time period (e.g., one year or two years) after the images are stored in the data repository 506.

Figure 6:
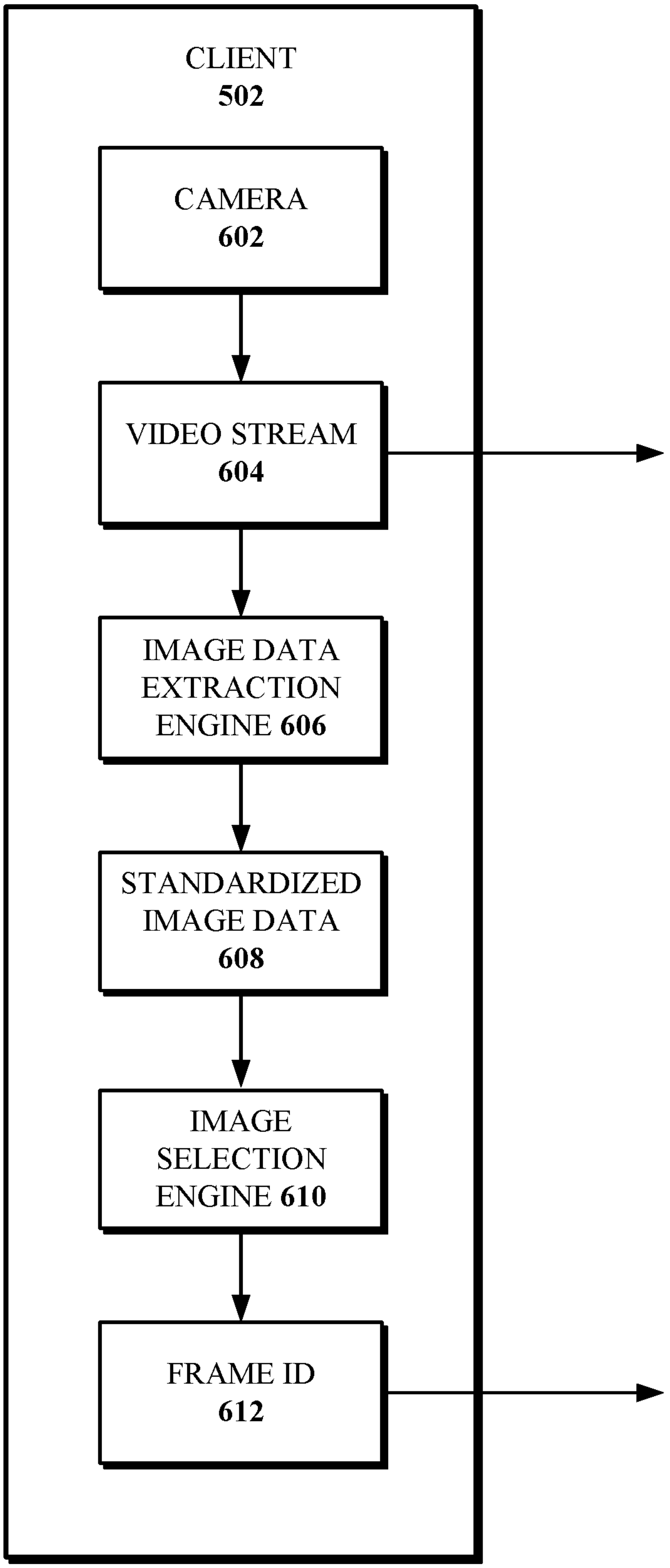
FIG. 6 is a block diagram of an example of a client in the video conferencing system.

FIG. 6 is a block diagram of an example of the client 502. As shown, the client 502 includes a camera 602. The camera 602 may be an internal camera or an external camera connected to the client 502 via a wired connection or a wireless connection. During the video conference, the camera 602 generates a video stream 604. The video stream 604 is transmitted, via the network 508, to the server 504 and to other clients connected to the conference. The video stream 604 is also provided to an image data extraction engine 606. The image data extraction engine 606 converts video frames in the video stream 604 into standardized image data 608 in a standardized format (e.g., a bitmap, a vector image, a matrix of values corresponding to colors of pixels, or another format). The standardized image data 608 is provided to an image selection engine 610. More details of the image data extraction engine 606 are described in conjunction with FIG. 8.

The image selection engine 610 identifies, using artificial intelligence or machine learning techniques, a video frame (or multiple video frame) having a specified feature based on the standardized image data 608 for the video frame. The image selection engine 610 may be configured based on configuration data that was downloaded to the client 502 before or during the video conference based on an identification of the feature by the user of the client 502 or by another user. The image selection engine 610 outputs a frame identifier (ID) 612 of the identified video frame. The frame ID 612 is transmitted to the server 504 to cause the server 504 to generate an image based on the frame ID 612. More details an example of the image selection engine 610 are described in conjunction with FIG. 9. In some cases, the frame ID 612 is output in conjunction with a hit model ID. The frame ID 612 may specify a period of video frame data (e.g., a contiguous time period which may be of a predetermined time length, such as 3 seconds or 4 seconds). Alternatively, the frame ID may specify a single frame, and the period may be determined by the server 504. The hit model ID specifies which model (e.g., cheerful, professional, or smiling) is used to identify the frame ID 612. The frame ID 612 and the hit model ID are transmitted to the server 504 for refinement of the imagery of the user based on the frame ID 612 and the hit model ID. The period of video frame data corresponds to a part of the video stream 604, which is also transmitted to the server 504.

Figure 7:
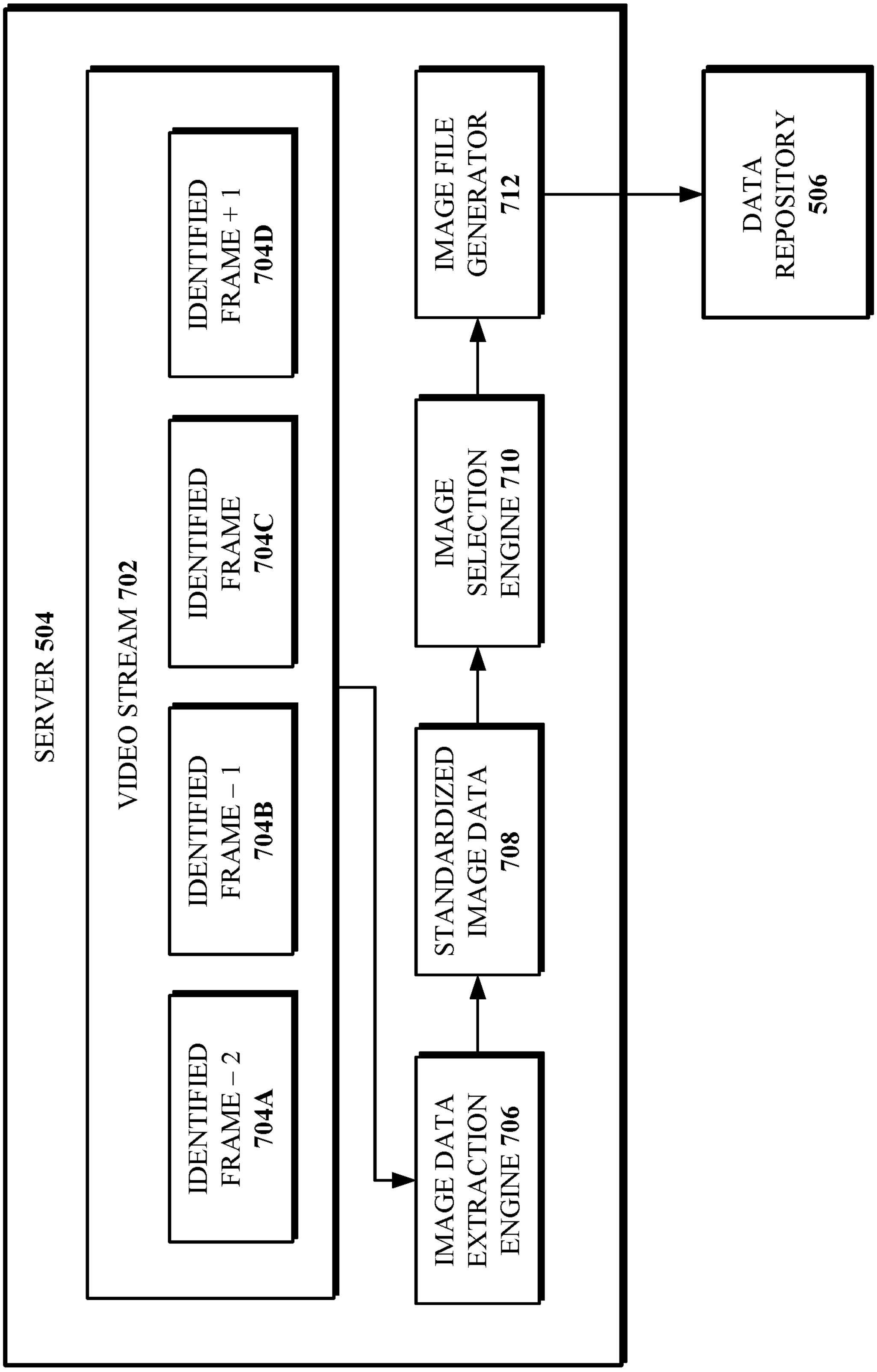
FIG. 7 is a block diagram of an example of a server in the video conferencing system.

FIG. 7 is a block diagram of an example of the server 504. As shown, the server accesses the video stream 702 generated by the camera 602 of the client 502 in the video conference. The video stream 702 may correspond to all or a portion of the video stream 604 described in conjunction with FIG. 6. As shown, the video stream 702 includes frames 704A-D, with the frame 704C corresponding to an identified frame (e.g., by the frame ID 612 generated by the client 502). The frames 704A-D are a time-contiguous set of frames, with "identified frame−2" 704A being two frames preceding the identified frame 704C, "identified frame−1" 704B being the frame preceding the identified frame 704C, and "identified frame+1" 704D being the frame following the identified frame 704C. As illustrated, the time-contiguous set of frames 704A-D that are processed from the video stream 702 includes four frames. In alternative implementations, a different number of time-contiguous frames could be used, with the set starting a different number than two frames before the identified frame, and with the set ending a different number than one frame after the identified frame. The frames 704A-D may be saved in a predefined space in the memory of the server 504. In some cases, the frames 704A-D are determined based on the frame ID 612 provided by the client 502 and are processed using a model corresponding to the hit model ID provided by the client 502. In some cases, an image corresponding to the identified frame 704C is saved to the data repository 506 in real time upon receipt of the frame ID 612 and the video stream 702 by the server 504. As a result, the user is able to access their imagery quickly if they have immediate uses for their imagery. Additional processing, as described below, may be completed at a later time (e.g., when demand for the server 504 is below a threshold demand level or when the workload of the server 504 is below a threshold workload level) to generate an improved image of the user for storage in the data repository 506.

As illustrated, the server 504 provides the frames 704A-D from the video stream 702 to an image data extraction engine 706. The image data extraction engine 706 is structured similarly to the image data extraction engine 606 of the client 502 and converts each of at least a subset of the frames 704A-D into standardized image data 708 (which is similar to the standardized image data 608 of the client 502). The standardized image data 708 is provided to an image selection engine 710 (which is similar to the image selection engine 610 of the client 502). The image selection engine scores each image corresponding to the frames 704A-D represented in the standardized image data 708 based on how likely the image is to have the specified feature. The standardized image data 708 for the frame having the highest score (i.e., most likely to have the feature or most strongly representing the feature) is provided to the image file generator 712 for generating an image file (e.g., a JPEG file, a GIF file, or another image file type) including an image based on the frame. In some cases, the image file includes the facial imagery from the frame and a background that is different from the frame (e.g., a white background, a preset background (e.g., including a company logo), or a user-selected background). The image file generated by the image file generator 712 is transmitted to the data repository 506 for storage thereat. From the data repository 506, the image file may be downloaded to the client 502 or to another computer by the user of the client 502 or by another person who has permission to access the image file.

Figure 8:
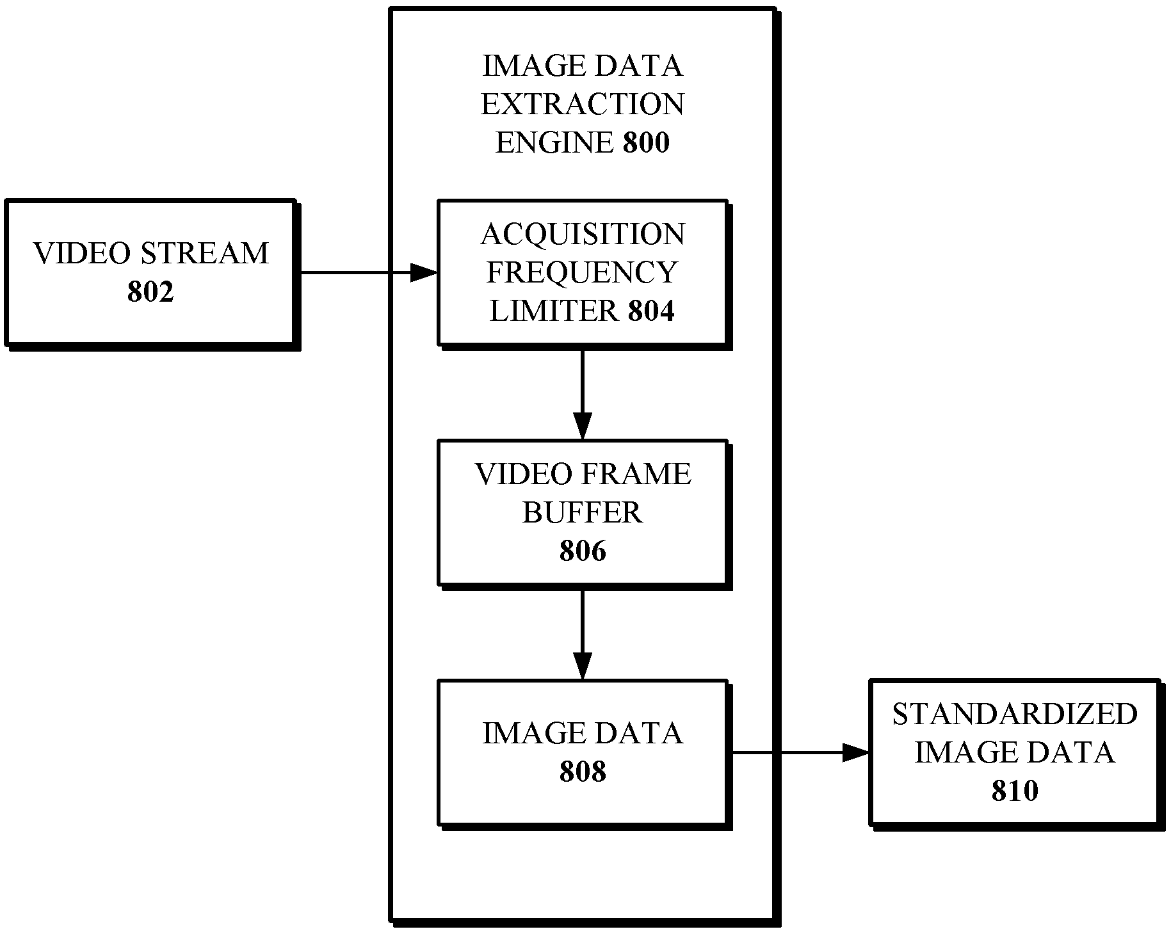
FIG. 8 is a block diagram of an example of an image data extraction engine.

FIG. 8 is a block diagram of an example of an image data extraction engine 800. The image data extraction engine 800 may correspond to the image data extraction engine 606 of the client 502 or the image data extraction engine 706 of the server 504.

As shown, the image data extraction engine 800 accesses a video stream 802. The video stream 802 may be the video stream 604 generated by the camera 602 of the client 502. Alternatively, the video stream 802 may be the video stream 702 received by the server 504, which includes the time-contiguous set of frames 704A-D surrounding the identified frame 704C.

In the image data extraction engine 800, the video stream 802 is provided to an acquisition frequency limiter 804. The acquisition frequency limiter 804 may include software and/or hardware that limits the maximum rate at which data is acquired from the video stream 802. The video stream 802 may be continuously generated by the camera 602 of the client 502 and may be continuously provided to the image data extraction engine 800 at the client 502 and/or the server 504. For example, the acquisition frequency limiter 804 may obtain 1 video frame per second, 30 video frames per second, 100 video frames per second, or another number of video frames per second. The frequency at which video frames are obtained by the acquisition frequency limiter 804 may be set based on at least one of a processing speed of the client 502, a processing speed of the server 504, a network speed, or a processing speed of the camera 602.

The acquisition frequency limiter 804 receives data from the video stream 802 and receives a clock signal. The clock signal controls the rate at which video frames are generated and provided as output to a video frame buffer 806. The clock signal is used to cause one video frame to be generated every 1/n seconds if the acquisition frequency limiter 804 is set to obtain n frames per second. For example, if the acquisition frequency limiter 804 obtains 25 frames per second, the clock signal is used to cause one video frame to be generated every 0.04 seconds. The video frame buffer 806 stores video frames (e.g., the video frames 704A-D at the server 504 or other video frames) for further processing. For each video frame of at least a subset of the generated video frames, the image data extraction engine 800 accesses image data 808 from the video frame buffer 806. The image data 808 is converted into a standardized format (e.g., a bitmap) to generate standardized image data 810. The standardized image data 810 is the output of the image data extraction engine 800 and is provided for further processing (e.g., by the image selection engine 610 of the client 502 or by the image selection engine 710 of the server 504) as described herein.

At the client 502, the image data extraction engine 606 may process video frames during the entire video stream 604, and the acquisition frequency limiter may be set to process frames at a low rate (e.g., one frame per second or one frame per n seconds, where n is greater than one). This may result in video frames being generated and processed at a rate that does not overwhelm the processing capabilities of the client 502.

At the server 504, the image data extraction engine 706 might only process a small portion of the video stream 702 surrounding (in time) the identified frame 704C corresponding to the frame ID 612. The acquisition frequency limiter may be set to process frames at a high rate (e.g., m frames per second, where m is greater than one). As a result, the server 504 is able to process multiple video frames proximate to the video frame identified by the client in order to select a "best" image from among images corresponding to video frames that are proximate in time to one another.

Figure 9:
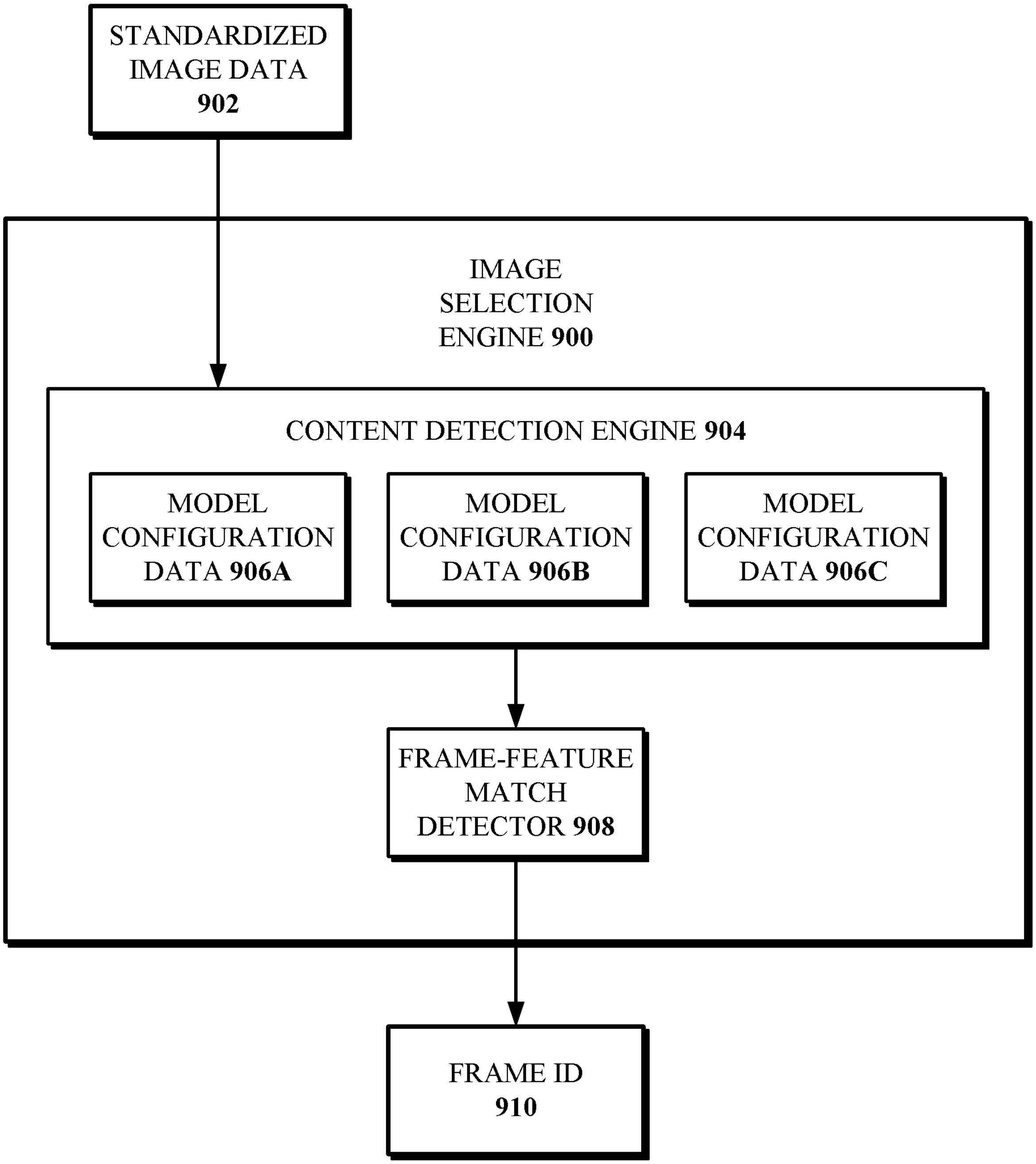
FIG. 9 is a block diagram of an example of an image selection engine.

FIG. 9 is a block diagram of an example of an image selection engine 900. The image selection engine 900 may correspond to the image selection engine 610 of the client 502 or the image selection engine 710 of the server 504.

As shown, the image selection engine 900 receives standardized image data 902 in a standardized format. The standardized image data 902 is provided to a content detection engine 904. The content detection engine 904 is an artificial intelligence or machine learning engine that is configured according to model configuration data 906A-C that the content detection engine 904 downloads for various features. For example, if a user requests an image of themselves where they are smiling, the user's employer requests and image of the user where the user appears professional, and the user's mother requests and image of the user where the user appears cheerful, the model configuration data 906A could correspond to "smiling," the model configuration data 906B could correspond to "professional," and the model configuration data 906C could correspond to "cheerful." Each of the model configuration data 906A-C might correspond to specific configurations of a neural network (e.g., neural network structures or weights applied to outputs of various neurons) or configurations for other artificial intelligence or machine learning models.

The content detection engine 904 computes, for each feature corresponding to the model configuration data 906A-C (e.g., "smiling," "professional," and "cheerful"), a score representing a likelihood that the standardized image data 902 has that feature. The computed scores are provided to a frame-feature match detector 908. The frame-feature match detector selects, for each feature and based on the score, a video frame having that feature. For example, the video frame with the highest (or lowest) score for each feature may be selected. The output of the frame-feature match detector 908 (and the image selection engine 900) is the frame ID 910 of the selected video frame. For the image selection engine 610 executing at the client 502, the frame ID 612 is transmitted to the server 504. For the image selection engine 710 executing at the server 504, the frame ID 910 is transmitted to the image file generator 712, which generates an image file corresponding to the frame ID 910.

In one example use case, Alex plans to participate in a video conference using the client 502. Prior to the video conference, Alex accesses the video conferencing application (e.g., at the client 502 or at another device associated with Alex's account) and inputs a request to generate an image of himself in the video conference that would be good for online dating. Alex's boss, Betsy, accesses the video conferencing application (at a device associated with Betsy's account) and inputs a request to generate photographs of her subordinates, including Alex, looking professional for placement on the company website. Alex's niece, Clara, accesses the video conferencing application (at a device associated with Clara's account) to request a photograph where Alex is smiling and looks cheerful for a school project that involves gathering photographs of family members.

When Alex connects to the video conference, via the client 502, a pop-up window appears on the client 502 informing Alex of all of the requests for the imagery-including his own request, Betsy's request, and Clara's request. Alex approves the use of his imagery to fulfill these requests and turns on the camera 602 of the client 502 to participate in the video conference.

The client 502 downloads (e.g., from the server 504, from the data repository 506, or from another location accessible via the network 508) configuration files (corresponding to the model configuration data 906A-C) based on the requests. One configuration file configures the image selection engine 610 of the client 502 to identify an image that is good for online dating, another configuration file configures the image selection engine 610 to identify an image that is professional, and another configuration file configures the image selection engine 610 to identify an image where the subject (Alex) is smiling and looks cheerful. The configuration file for "smiling" and "cheerful" may be a combination of two configuration files-one for "smiling" and one for "cheerful." In some cases, each configuration file configures an artificial intelligence or machine learning model to compute a score representing whether an image has the requested feature. For the combination of "smiling" and "cheerful," a mathematical combination (e.g., mean or a square root of a mean of squares) may be used. For example, if a given image has a score of 80 for "smiling" and 90 for "cheerful," the score for the combination of "smiling" and "cheerful" may be the mean of 80 and 90, which is 85, or the square root of the mean of 80 squared and 90 squared, which is approximately 85.15.

During the video conference, the client 502 generates the video stream 604 of Alex using the camera 602. The image data extraction engine 606 extracts one frame every two seconds and from the video stream 604 and generates standardized image data 608 from this frame. The standardized image data 608 is provided to the image selection engine 610, which selects video frames that meet the criteria of the configuration files. Identifiers (e.g., timestamps or frame numbers) of those video frames are stored as the frame ID 612 and transmitted to the server 504 along with the video stream 604. The frame ID 612 where Alex looks good for online dating is 00:10:20. The frame ID 612 where Alex look professional is 00:15:46. The frame ID 612 where Alex is smiling and look cheerful is 00:12:34. The video stream 604 is stored in the data repository 506 along with a recording of the video conference.

The night after the video conference, when demand for the server 504 is low (e.g., below a threshold demand level), the server 504 uses artificial intelligence or machine learning techniques to generate imagery of Alex having the requested features. The server 504 accesses the video stream 702 (corresponding to the video stream 604). The server 504 also accesses the frame IDs 612 provided by the client 502—00:10:20, 00:15:46, and 00:12:34. For each frame ID 612, the server 504 accesses a portion of the video stream 702 beginning two seconds before and ending two seconds after (e.g., from 00:10:18 until 00:10:22 for the 00:10:20 frame ID 612). The image data extraction engine 706 of the server extracts video frames at a rate of 25 frames per second and generates the standardized image data 708 for one hundred frames for each four second interval. The generated standardized image data 708 is provided to the image selection engine.

To obtain an image where Alex looks good for online dating in response to Alex's request, the server 504 accesses the portion of the video stream 702 starting two seconds before and ending two seconds after 00:10:20. The server 504 uses the image data extraction engine 706 to obtain standardized image data 708 for image frames between 00:10:18 and 00:10:22 at 25 frames per second. The image selection engine 710 then identifies the video frame (from among those one hundred (25 frames per second multiplied by four seconds) video frames) having the highest score for "online dating" using an artificial intelligence or machine learning engine configured according to a configuration file (e.g., the model configuration data 906A-C) for identifying images for online dating. The standardized image data 708 for that video frame are then provided to the image file generator 712 to generate an image file. The generated image file is stored in the data repository 506 and is accessible via the client 502 of Alex and/or via a user account of Alex.

To obtain an image where Alex looks professional in response to Betsy's request, the server 504 accesses the portion of the video stream 702 starting two seconds before and ending two seconds after 00:15:46. The server 504 uses the image data extraction engine 706 to obtain standardized image data 708 for image frames between 00:15:44 and 00:15:48 at 25 frames per second. The image selection engine 710 then identifies the video frame (from among those one hundred video frames) having the highest score for "professional" using an artificial intelligence or machine learning engine configured according to a configuration file (e.g., the model configuration data 906A-C) for identifying professional images. The standardized image data 708 for that video frame are then provided to the image file generator 712 to generate an image file. The generated image file is stored in the data repository 506 and is accessible via the client device of Betsy and/or via a user account of Betsy. In some cases, the generated image file is also accessible via the client 502 of Alex and/or via a user account of Alex. In some cases, Alex may review and provide approval of the generated image file before it is provided to Betsy.

To obtain an image where Alex is smiling and looks cheerful in response to Clara's request, the server 504 accesses the portion of the video stream 702 starting two seconds before and ending two seconds after 00:12:34. The server 504 uses the image data extraction engine 706 to obtain standardized image data 708 for image frames between 00:12:32 and 00:12:36 at 25 frames per second. The image selection engine 710 then identifies the video frame (from among those one hundred video frames) having the highest score for "smiling" and "cheerful" using an artificial intelligence or machine learning engine configured according to a configuration file (e.g., the model configuration data 906A-C) for identifying smiling and cheerful images. In some cases, two configuration files—one for "smiling" and one for "cheerful"—may be used, and the score may be a mathematical combination (e.g., mean or a square root of a mean of squares) of the score for "smiling" and the score for "cheerful." The standardized image data 708 for the video frame identified by the image selection engine 710 of the server 504 are then provided to the image file generator 712 to generate an image file. The generated image file is stored in the data repository 506 and is accessible via the client device of Clara and/or via a user account of Clara. In some cases, the generated image file is also accessible via the client 502 of Alex and/or via a user account of Alex. In some cases, Alex may review and provide approval of the generated image file before it is provided to Clara.

Figure 10:
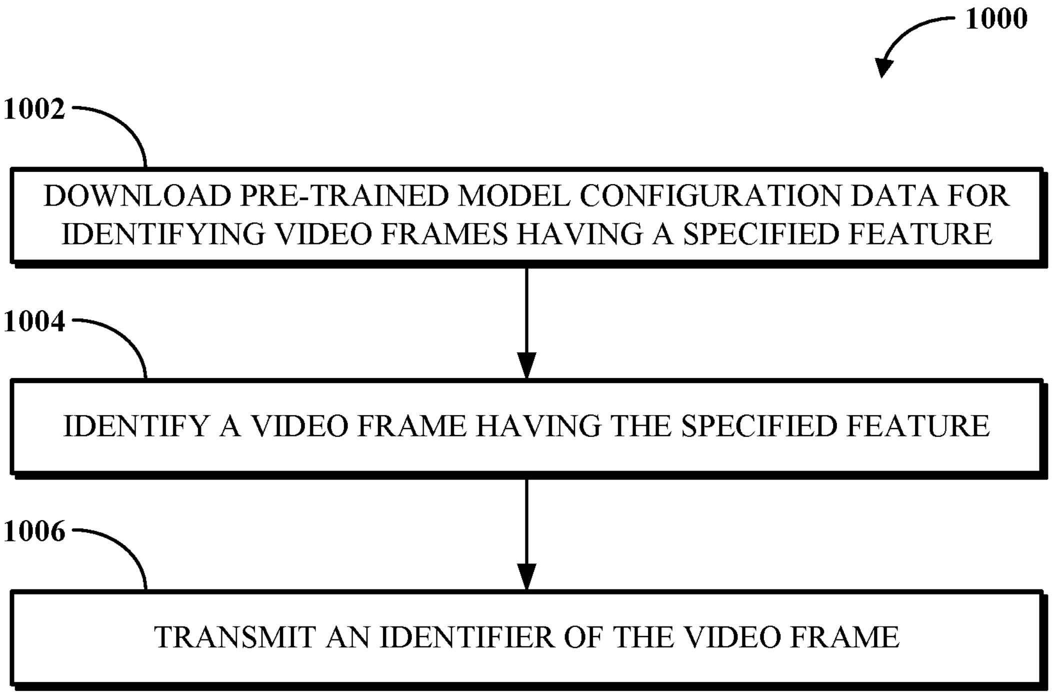
FIG. 10 is a flowchart of an example of a technique for identifying a video frame for an image in a video conference.
Figure 11:
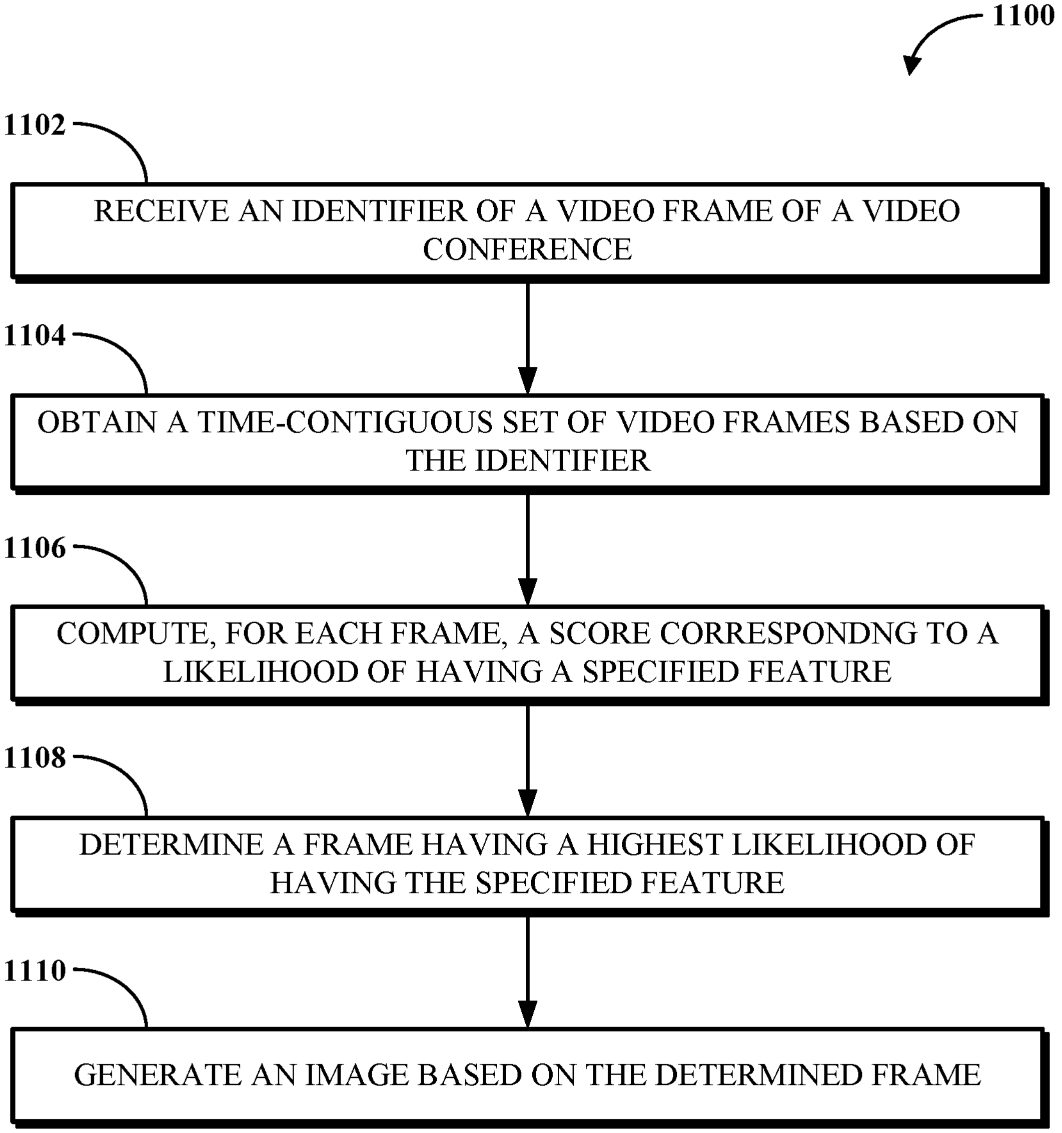
FIG. 11 is a flowchart of an example of a technique for generating an image in a video conference based on a specified feature and an identified video frame.

To further describe some implementations in greater detail, reference is next made to examples of techniques which may be performed by or using a system for identifying a video frame for an image in a video conference. FIG. 10 is a flowchart of an example of a technique 1000 for identifying a video frame for an image in a video conference. FIG. 11 is a flowchart of an example of a technique 1100 for generating an image in a video conference based on a specified feature and an identified video frame. The techniques 1000 and/or 1100 can be executed using computing devices, such as the systems, hardware, and software described with respect to FIGS. 1-9. The techniques 1000 and/or 1100 can be performed, for example, by executing a machine-readable program or other computer-executable instructions, such as routines, instructions, programs, or other code. The steps, or operations, of the techniques 1000, 1100, or another technique, method, process, or algorithm described in connection with the implementations disclosed herein can be implemented directly in hardware, firmware, software executed by hardware, circuitry, or a combination thereof.

For simplicity of explanation, the techniques 1000 and 1100 are depicted and described herein as a series of steps or operations. However, the steps or operations of the techniques 1000 and 1100 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 10 illustrates the technique 1000 for identifying a video frame for an image in a video conference. The technique 1000 may be performed at a client device (e.g., the client 502).

At 1002, the client device downloads pre-trained model configuration data (e.g., the model configuration data 906A-C) for identifying video frames having a specified feature. The pre-trained model configuration data may be downloaded by the client device in response to a user requesting imagery of themselves to be generated during a video conference or in response to another user (of another client device) requesting imagery of the user, and the user approving the request. The user may request imagery of themselves, for example, by providing a user input to the client device via a graphical user interface of the client device. Requests for imagery from other users may be received, at the client device, over a network and/or via a server associated with the video conferencing application that is responsible for communicating with client devices and processing such requests. The pre-trained configuration data may be associated with an artificial intelligence or machine learning model trained using supervised learning applied to a labeled training dataset with images of persons labeled as having certain features (e.g., smiling, cheerful, professional, physically attractive, crying, or angry).

At 1004, the client device identifies, using an image selection engine (e.g., the image selection engine 606) configured according to the pre-trained model configuration data, a video frame having the specified feature during an online video conference to which the client device is connected. The client device may configure the image selection engine according to the pre-trained model configuration data. For example, the client device may set weights in an artificial neural network based on the pre-trained model configuration data. In some implementations, the video frame is identified, by the client device, in real-time after generating the video frame by the camera of the client device. Alternatively, if there is contention for computing resources (e.g., processing hardware or memory) of the client device, identification of the video frame may be delayed.

At 1006, the client device transmits, to a server (e.g., the server 504), an identifier of the video frame for storage in connection with a recording of the video conference. The client device also transmits to the server (or to a data repository accessible to the server) the video stream generated by the client device during the video conference for transmission to other client devices connected to the video conference. Receipt of the identifier causes the server to generate an image (e.g., an image file or an image stored in another format) corresponding to the video frame.

As used herein, the term real-time means, among other things, without any intentional delay. Event B occurs in real-time after event A if event B occurs one second, one minute, or one hour after event A, as long as the delay is not intentional. There may still be a delay, for example, due to time required to transmit or process (potentially large amounts of) information or to execute (potentially complex) calculations.

FIG. 11 illustrates the technique 1100 for generating an image in a video conference based on a specified feature and an identified video frame. The technique 1100 may be performed at a server (e.g., the server 504).

At 1102, the server receives, from a client device (e.g., the client 502), an identifier of a video frame of a video conference. The identifier of the video frame may be received, for example, using the technique 1000 of FIG. 10. The identifier may be a timestamp or a frame identification number.

At 1104, the server obtains a time-contiguous set of video frames based on the identifier of the video frame. The time-contiguous set of video frames is from a camera-generated video stream of the client device in the video conference. The time-contiguous set of video frames may include m frames preceding the video frame of the identifier and n frames succeeding the video frame of the identifier, where m and n are positive integers. In some cases, m is equal to n. Alternatively, m might not be equal to n.

At 1106, the server computes, for each frame in at least a subset of the time-contiguous set of video frames, a score corresponding to a likelihood of having a specified feature. The score may be computed using at least one of a statistical technique, an artificial intelligence technique, or a machine learning technique. In some examples, the score is computed using an artificial neural network configured according to a configuration file.

At 1108, the server determines, based on the computed scores, a frame having a highest likelihood of having the specified feature. The obtaining of the time-contiguous set of video frames, the computing of the scores, and the determining the video frame having the highest likelihood of having the specified feature may be done when demand for the server is below a threshold demand level (e.g., when there are fewer than a first threshold number of devices connected to video conferences and fewer than a second threshold number of ongoing video conferences if the server is a conferencing server). The demand for the server may be below the threshold demand level, for example, during non-business hours, during the night, on weekends, or on holidays.

At 1110, the server generates, for storage in a data repository, an image based on the determined frame. The image stored in the data repository may be accessible to the client device. With the permission of the user of the client device, the image stored in the data repository may be accessible to users of other devices. For example, the image may be provided to an administrator device different from the client device if the request including features of the image was received from the administrator device. In some implementations, the server does a first-pass where the server obtains an image from each of multiple time-contiguous sets and then a second-pass where the server determines the best first-pass image.

In some cases, the server generates the image by identifying, using a computer vision engine, a foreground of the determined frame. The server generates the image to include the foreground of the determined frame and a preset background different from a background of the identified frame. The preset background may include a background provided by the user of the client device (e.g., a background the user likes) or a background provided by the administrator via the administrator device (e.g., including a company logo).

Some implementations are described below as numbered examples (Example 1, 2, 3, etc.). These examples are provided as examples only and do not limit the other implementations disclosed herein.

Example 1 is a method, comprising: downloading, to a client device, pre-trained model configuration data for identifying video frames having a specified feature; identifying, using an image selection engine configured according to the pre-trained model configuration data, a video frame having the specified feature during an online video conference to which the client device is connected; and transmitting, to a server, an identifier of the video frame for storage in connection with a recording of the online video conference.

In Example 2, the subject matter of Example 1 includes, wherein the identifier comprises a timestamp.

In Example 3, the subject matter of Examples 1-2 includes, wherein transmitting the identifier to the server comprises: transmitting the identifier to the server to cause the server to generate an image corresponding to the video frame.

In Example 4, the subject matter of Examples 1-3 includes, generating a video stream by a camera of the client device for transmission to the video conference; and obtaining the video frame from the video stream.

In Example 5, the subject matter of Examples 1-4 includes, identifying the video frame in real-time after generating the video frame by a camera of the client device.

In Example 6, the subject matter of Examples 1-5 includes, downloading the pre-trained model configuration data in response to receiving, over a network, an indication of the specified feature.

In Example 7, the subject matter of Examples 1-6 includes, downloading the pre-trained model configuration data in response to receiving, via a graphical user interface of the client device, a user input representing the specified feature.

In Example 8, the subject matter of Examples 1-7 includes, configuring an artificial neural network of the image selection engine according to weights provided in the pre-trained model configuration data.

Example 9 is a non-transitory computer readable medium storing instructions operable to cause one or more processors to perform operations comprising: downloading, to a client device, pre-trained model configuration data for identifying video frames having a specified feature; identifying, using an image selection engine configured according to the pre-trained model configuration data, a video frame having the specified feature during an online video conference to which the client device is connected; and transmitting, to a server, an identifier of the video frame for storage in connection with a recording of the online video conference.

In Example 10, the subject matter of Example 9 includes, wherein the identifier comprises a frame identification number.

In Example 11, the subject matter of Examples 9-10 includes, wherein transmitting the identifier to the server comprises: transmitting the identifier to the server to prompt the server to generate an image corresponding to the video frame.

In Example 12, the subject matter of Examples 9-11 includes, the operations comprising: generating, by the client device, a video stream by a camera of the client device for transmission to the video conference; and obtaining the video frame from the video stream.

In Example 13, the subject matter of Examples 9-12 includes, the operations comprising: identifying the video frame in real-time after generating the video frame by the client device.

In Example 14, the subject matter of Examples 9-13 includes, the operations comprising: downloading the pre-trained model configuration data in response to receiving an indication of the specified feature.

In Example 15, the subject matter of Examples 9-14 includes, the operations comprising: downloading the pre-trained model configuration data in response to receiving, via a user interface of the client device, a user input representing the specified feature.

In Example 16, the subject matter of Examples 9-15 includes, the operations comprising: configuring an artificial neural network of the image selection engine based on weights provided in the pre-trained model configuration data.

Example 17 is a system, comprising: a memory subsystem; and processing circuitry configured to execute instructions stored in the memory subsystem to: download, to a client device, pre-trained model configuration data for identifying video frames having a specified feature; identify, using an image selection engine configured according to the pre-trained model configuration data, a video frame having the specified feature during an online video conference to which the client device is connected; and transmit, to a server, an identifier of the video frame for storage in connection with a recording of the online video conference.

In Example 18, the subject matter of Example 17 includes, wherein the identifier comprises at least one of a timestamp or a frame identification number.

In Example 19, the subject matter of Examples 17-18 includes, wherein transmitting the identifier to the server comprises: transmitting the identifier to the server to cause the server to generate an image file.

In Example 20, the subject matter of Examples 17-19 includes, the processing circuitry configured to execute the instructions stored in the memory subsystem to: obtain the video frame from a video stream generated for transmission to the video conference.

Example 21 is a method, comprising: receiving, by a server, an identifier of a video frame of a video conference from a client device; obtaining, by the server, a time-contiguous set of video frames based on the identifier; computing, for each frame in at least a subset of the time-contiguous set of video frames, a score corresponding to a likelihood of having a specified feature; determining, based on the computed scores, a frame having a highest likelihood of having the specified feature; and generating, for storage in a data repository, an image based on the determined frame.

In Example 22, the subject matter of Example 21 includes, wherein the time-contiguous set of video frames is from a camera-generated video stream of the client device in the video conference.

In Example 23, the subject matter of Examples 21-22 includes, wherein the time-contiguous set of video frames includes m frames before a video frame associated with the identifier and n frames after the video frame associated with the identifier, wherein m and n are positive integers.

In Example 24, the subject matter of Examples 21-23 includes, wherein the identifier comprises a timestamp.

In Example 25, the subject matter of Examples 21-24 includes, providing, to the client device, access to the image in the data repository.

In Example 26, the subject matter of Examples 21-25 includes, providing, to an administrator device different from the client device, access to the image in the data repository.

In Example 27, the subject matter of Examples 21-26 includes, wherein generating the image comprises: identifying a foreground of the determined frame; and generating the image to include the foreground of the determined frame and a preset background different from a background of the determined frame.

In Example 28, the subject matter of Examples 21-27 includes, wherein computing the score and determining the frame occur at a time when demand for the server is below a threshold demand level.

In Example 29, the subject matter of Examples 21-28 includes, wherein the server receives multiple identifiers, including the identifier, wherein the server determines, for each of the multiple identifiers, a corresponding frame having the highest likelihood of having the specified feature, the method further comprising: selecting, from among the corresponding frames, a first frame based on the likelihood of having the specified feature, wherein the generated image for storage in the data repository corresponds to the first frame.

Example 30 is a non-transitory computer readable medium storing instructions operable to cause one or more processors to perform operations comprising: receiving, by a server, an identifier of a video frame of a video conference from a client device; obtaining, by the server, a time-contiguous set of video frames based on the identifier; computing, for each frame in at least a subset of the time-contiguous set of video frames, a score corresponding to a likelihood of having a specified feature; determining, based on the computed scores, a frame having a highest likelihood of having the specified feature; and generating, for storage in a data repository, an image based on the determined frame.

In Example 31, the subject matter of Example 30 includes, wherein the time-contiguous set of video frames is from a camera-generated video stream of the client device.

In Example 32, the subject matter of Examples 30-31 includes, wherein the time-contiguous set of video frames includes m frames before a video frame associated with the identifier and n frames after the video frame associated with the identifier, wherein m and n are positive numbers.

In Example 33, the subject matter of Examples 30-32 includes, wherein the identifier comprises a frame identification number.

In Example 34, the subject matter of Examples 30-33 includes, the operations comprising: providing, to a device different from the client device, access to the image in the data repository.

In Example 35, the subject matter of Examples 30-34 includes, the operations comprising: providing, to an administrator device, access to the image in the data repository.

In Example 36, the subject matter of Examples 30-35 includes, wherein generating the image comprises: identifying a foreground of the determined frame; and generating the image to include the identified foreground and a preset background different from a background of the determined frame.

Example 37 is a system, comprising: a memory subsystem; and processing circuitry configured to execute instructions stored in the memory subsystem to: receiving, by a server, an identifier of a video frame of a video conference from a client device; obtaining, by the server, a time-contiguous set of video frames based on the identifier; computing, for each frame in at least a subset of the time-contiguous set of video frames, a score corresponding to a likelihood of having a specified feature; determining, based on the computed scores, a frame having a highest likelihood of having the specified feature; and generating, for storage in a data repository, an image based on the determined frame.

In Example 38, the subject matter of Example 37 includes, wherein the time-contiguous set of video frames is generated by a camera of the client device.

In Example 39, the subject matter of Examples 37-38 includes, wherein the time-contiguous set of video frames includes m frames before a video frame associated with the identifier and m frames after the video frame associated with the identifier, wherein m is a positive integer.

In Example 40, the subject matter of Examples 37-39 includes, wherein the identifier comprises at least one of a timestamp or a frame identification number.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry. The memory subsystem may include a single memory unit or multiple joint or disjoint memory units, which each of the multiple joint or disjoint memory units storing all or a portion of the data described as being stored in the memory subsystem.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

downloading, by a client device, pre-trained model configuration data for identifying video frames having a specified feature;

identifying, by the client device and using an image selection engine configured according to the pre-trained model configuration data, a video frame having the specified feature during an online video conference to which the client device is connected;

transmitting, by the client device, to a server, without transmitting image data of the video frame, an identifier of the video frame that identifies the video frame within a camera-generated video stream of the client device, for storage in connection with a recording of the online video conference, the identifier comprising at least one of a timestamp or a frame identification number; and transmitting, by the client device, to the server, a model identifier identifying which model of a plurality of models was used by the image selection engine to identify the video frame as having the specified feature, the model identifier causing the server to process the video frame using the identified model.

2. The method of claim 1, wherein the identifier comprises a timestamp.

3. The method of claim 1, wherein transmitting the identifier to the server comprises:

transmitting the identifier to the server to cause the server to generate, based on the video frame, an image in a standalone image file format separate from a video recording format.

4. The method of claim 1, comprising:

generating a video stream by a camera of the client device for transmission to the video conference; and obtaining the video frame from the video stream.

5. The method of claim 1, comprising:

identifying the video frame in real-time after generating the video frame by a camera of the client device.

6. The method of claim 1, comprising:

downloading the pre-trained model configuration data in response to receiving, over a network, an indication of the specified feature.

7. The method of claim 1, comprising:

downloading the pre-trained model configuration data in response to receiving, via a graphical user interface of the client device, a user input representing the specified feature.

8. The method of claim 1, comprising:

configuring an artificial neural network of the image selection engine according to weights provided in the pre-trained model configuration data.

9. A non-transitory computer readable medium storing instructions operable to cause one or more processors to perform operations comprising:

downloading, by a client device, pre-trained model configuration data for identifying video frames having a specified feature;

identifying, by the client device and using an image selection engine configured according to the pre-trained model configuration data, a video frame having the specified feature during an online video conference to which the client device is connected;

transmitting, by the client device, to a server, without transmitting image data of the video frame, an identifier of the video frame that identifies the video frame within a camera-generated video stream of the client device, for storage in connection with a recording of the online video conference, the identifier comprising at least one of a timestamp or a frame identification number; and transmitting, by the client device, to the server, a model identifier identifying which model of a plurality of models was used by the image selection engine to identify the video frame as having the specified feature, the model identifier causing the server to process the video frame using the identified model.

10. The non-transitory computer readable medium of claim 9, wherein the identifier comprises a frame identification number.

11. The non-transitory computer readable medium of claim 9, wherein transmitting the identifier to the server comprises:

transmitting the identifier to the server to prompt the server to generate an image corresponding to the video frame, the identifier causing the server to generate the image by identifying a foreground of the video frame and generating the image to include the foreground and a preset background different from a background of the video frame.

12. The non-transitory computer readable medium of claim 9, the operations comprising:

generating, by the client device, a video stream by a camera of the client device for transmission to the video conference; and obtaining the video frame from the video stream.

13. The non-transitory computer readable medium of claim 9, the operations comprising:

identifying the video frame in real-time after generating the video frame by the client device.

14. The non-transitory computer readable medium of claim 9, the operations comprising:

downloading the pre-trained model configuration data in response to receiving an indication of the specified feature.

15. The non-transitory computer readable medium of claim 9, the operations comprising:

downloading the pre-trained model configuration data in response to receiving, via a user interface of the client device, a user input representing the specified feature.

16. The non-transitory computer readable medium of claim 9, the operations comprising:

configuring an artificial neural network of the image selection engine based on weights provided in the pre-trained model configuration data.

17. A system, comprising:

a memory subsystem; and processing circuitry configured to execute instructions stored in the memory subsystem to:

download, by a client device, pre-trained model configuration data for identifying video frames having a specified feature;

identify, by the client device and using an image selection engine configured according to the pre-trained model configuration data, a video frame having the specified feature during an online video conference to which the client device is connected;

transmit, by the client device, to a server, without transmitting image data of the video frame, an identifier of the video frame that identifies the video frame within a camera-generated video stream of the client device, for storage in connection with a recording of the online video conference, the identifier comprising at least one of a timestamp or a frame identification number; and transmitting, by the client device, to the server, a model identifier identifying which model of a plurality of models was used by the image selection engine to identify the video frame as having the specified feature, the model identifier causing the server to process the video frame using the identified model.

18. The system of claim 17, wherein the identifier comprises at least one of a timestamp or a frame identification number.

19. The system of claim 17, wherein transmitting the identifier to the server comprises:

transmitting the identifier to the server to cause the server to generate an image file.

20. The system of claim 17, the processing circuitry configured to execute the instructions stored in the memory subsystem to:

obtain the video frame from a video stream generated for transmission to the video conference.

21. The method of claim 1, wherein the pre-trained model configuration data identifies weights for configuring the image selection engine to score and select individual video frames.

* * * * *